A. NOBEL.
MANUFACTURE OF NITRINE OR CRYSTALLIZING NITROGLYCERIN.
No 3,381. Reissued Apr. 13, 1869.
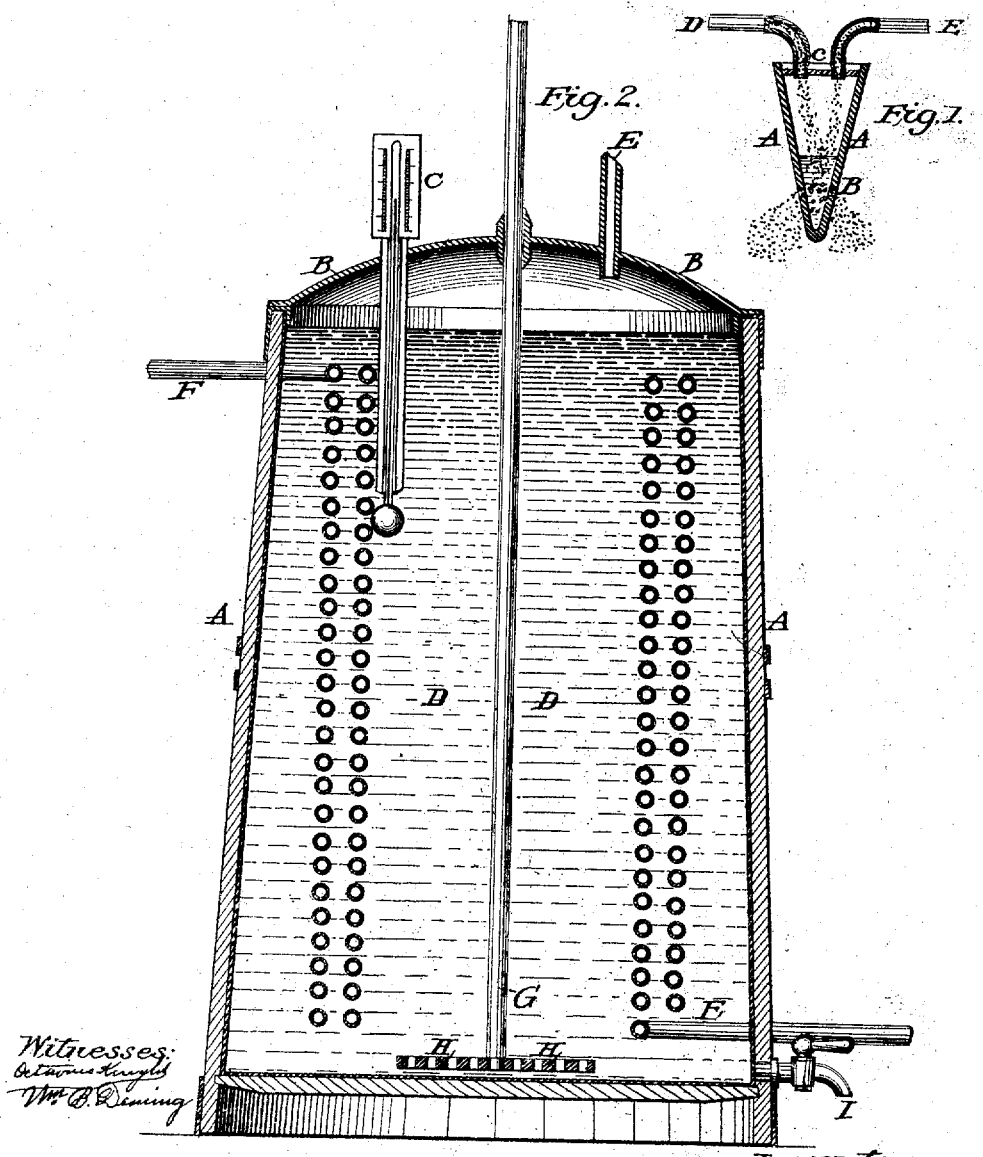
Witnesses:
Octavius Knight
Wm. B. Deming
Inventor:
Alfred Nobel.

United States Patent Office.

THE UNITED STATES BLASTING-OIL COMPANY, OF NEW YORK, N. Y., ASSIGNEES OF ALFRED NOBEL.

*Letters Patent No.* 57,175, *dated August* 14, 1866; *reissue No.* 2,538, *dated April* 2, 1867; *reissue No.* 3,381, *dated April* 13, 1869.

DIVISION 1.

IMPROVEMENT IN THE MANUFACTURE OF NITRINE OR CRYSTALLIZING NITRO-GLYCERINE.

The Schedule referred to in these Letters Patent and making part of the same

*To all whom it may concern:*

Be it known that ALFRED NOBEL, of the free city of Hamburg, Germany, invented a new Explosive Compound; and we do hereby declare the following to be a full, clear, and exact description of that part of the said invention which consists in the production of nitrine or crystallizing nitro-glycerine, prepared by the admixture of glycerine, sulphuric acid, and nitric acid, free, or nearly free from hyponitric acid, as a new article of manufacture, so that the compound thus produced, will not decompose, and so that it may become solidified at a moderate temperature, and may be transported, and used with greater safety than ordinary nitro-glycerine.

The essential physical property which distinguishes the said nitrine or crystallizing nitro-glycerine from the nitro-glycerine discovered by Sobrero, and described in chemical works, is that the former passes into a solid form when exposed to a moderate temperature, its melting point being at 55° Fahrenheit, or thereabouts, according to its purity, while the ordinary nitro-glycerine, as stated in chemical works, has been subjected to a cold below the zero of Fahrenheit, without losing its liquid state, and has in fact, been known for twenty years without ever having been obtained in a solid form.

The essential difference in the preparation between the said nitrine or crystallizing nitro-glycerine and the nitro-glycerine previously discovered, is that the latter is obtained when fuming nitric acid is used in the operation, whereas, the preparation of the former requires a nitric acid free, or comparatively free from hyponitric acid.

The complete distinction between the two compounds is proved by the fact that when crystallized nitro-glycerine is made with a nitric acid, but little charged with hyponitric acid, a small quantity of the non-crystallizing nitro-glycerine is obtained, which remains liquid, while the crystallizing nitro-glycerine passes into a solid state.

Another distinction is that the crystallizing nitro-glycerine is not liable to decomposition, and after being properly washed, does not present any acid reaction, whereas the ordinary nitro-glycerine, as clearly stated in chemical works, decomposes of itself and deposes oxalic salts.

In order to enable others skilled in the arts to use said invention, we herein describe the process and mechanical parts invented by the said NOBEL, for manufacturing the said nitrine or crystallizing nitro-glycerine, having reference to the accompanying drawing.

In the drawing—

Figure 1 represents a funnel-shaped vessel, made of stone, lead, or other suitable material.

A is the vessel;

B, perforations through the vessel;

C is a cover; and

D and E are tubes connected with reservoir tanks of sufficient elevation to allow the influence of gravitation and atmospheric pressure to force the liquids contained, to descend in such manner that they will mingle or mix before they reach the water in which the said vessel is placed.

There may be perforated disks in the said funnel-shaped vessel placed so that the liquids will have additional opportunity to mix before they reach the water.

The glycerine being thus mixed with the acids, nitrine or crystallizing nitro-glycerine will be formed, which, when in the water separates from the acids.

The glycerine should enter the vessel through the pipe D, and the acids, one part nitric acid, say 48° Baumé, specific gravity, free or comparatively free from hyponitric acid, and two parts sulphuric acid, say 66° Baumé, specific gravity, through the other pipe E.

Figure 2 represents another mode or process of manufacturing.

A A is a tank, or vessel, made of stone, lead, or other suitable material, which will not be injuriously affected by the action of the acids.

B B is the cover on the tank, or vessel.

C is a thermometer, intended to be suspended into the liquid D in the tank.

E is a pipe entering the tank through the cover B B, to conduct glycerine from a reservoir above, into the tank.

F F is a worm, or coil of lead, or of other suitable material, to conduct cold water from a reservoir above, in order to cool the liquid within the tank.

G G is a rod made of suitable material, having attached thereto a perforated disk, H H.

The rod is attached above, to any known mechanical contrivance that will cause it to be raised and lowered at the will of the manipulator.

I is a faucet, through which the mixed materials, or liquids will be drawn from the tank A A.

The operation of this apparatus is as follows:

The vessel A A is filled with the necessary quantity of mixed acids, in the proportions of say, one part more or less of nitric acid, free or comparatively free from hyponitric acid, and two parts more or less of sulphuric acid.

This mixed acid is brought to a low temperature, say 32° Fahrenheit, and the dasher H H on the rod G G is put in motion, up and down, which produces agitation of the liquids.

The glycerine is then allowed to flow into the tank A A through the tube E, in such quantities as the temperature may justify.

The temperature will rise and fall in proportion to the agitation and introduction of the glycerine, which can be adjusted by a faucet attached to the pipe, or tube E.

Ordinarily one pound of glycerine is compounded with eight pounds of mixed acids, according to the foregoing proportions of acids.

A change may be made from this formula, according to the quality of the acids and glycerine respectively.

When the glycerine and acids have been thus treated by agitation, to the extent of the formula, they are then discharged into a tank, or vessel containing water, one part of the said mixture to eight parts or more of pure water.

This acidulated water is well stirred, which agitation separates the nitrine or crystallizing nitro-glycerine from the acids.

The specific gravity of the nitrine or crystallizing nitro-glycerine is about 1.60° Baumé, or six-tenths heavier than water; the acids becoming diluted by the water, are lighter, and the nitro-glycerine being the heavier, falls to the bottom of the tank.

In this manner, and by the contrivances mentioned, NOBEL accomplishes the manufacture of nitrine or crystallizing nitro-glycerine in any desired quantity, more economically than can be accomplished by any hitherto known mode.

Although we prefer to use the cooling-coil in this process, it may be dispensed with if desired, and other modes of agitation adopted.

What we claim as the invention of ALFRED NOBEL, and desire to secure by Letters Patent, is—

The mode or process, substantially as hereinbefore described, of mixing together glycerine, sulphuric acid, and nitric acid, free or nearly free from hyponitric acid, in the production as a new article of manufacture of nitrine or crystallizing nitro-glycerine.

TAL. P. SHAFFNER,
*President, &c.*
JAMES DEVEAU,
*Secretary of The United States Blasting-Oil Company.*

Witnesses:
OCTAVIUS KNIGHT,
WM. B. DEMING.